United States Patent [19]

Schoenick

[11] 4,267,691
[45] May 19, 1981

[54] CHAIN HAVING PIVOT PINS ALSO PREVENTING DISASSEMBLY

[75] Inventor: Ralph R. Schoenick, Mequon, Wis.

[73] Assignee: Rexnord Inc., Milwaukee, Wis.

[21] Appl. No.: 93,573

[22] Filed: Nov. 13, 1979

[51] Int. Cl.³ .............................................. F16G 13/06
[52] U.S. Cl. ........................................ 59/85; 198/851; 474/227
[58] Field of Search ............... 59/84, 85, 86, 87, 88, 59/89, 93; 474/210, 212, 227; 98/851, 852

[56] References Cited

U.S. PATENT DOCUMENTS

| 1,824,341 | 9/1931 | Wendt | 59/93 |
|---|---|---|---|
| 2,298,604 | 10/1942 | Webb | 474/227 |
| 4,020,629 | 5/1977 | Wilmot et al. | 59/85 |
| 4,143,512 | 3/1979 | Templin | 59/85 |
| 4,150,584 | 4/1979 | Theijsmeijer | 74/255 R |
| 4,198,814 | 4/1980 | Schoenick | 59/84 |

FOREIGN PATENT DOCUMENTS 565271  3/1958  Belgium ................ 59/85

Primary Examiner—John McQuade

[57] ABSTRACT

The center link of a trolley conveyor chain of thermoplastic construction is provided with a bushing insert for the pin which is pivotable on oppositely projecting studs of the center link. The studs also prevent the free movement of the pin in the slot and serve as detents to prevent the unintended disassembly of the chain.

2 Claims, 4 Drawing Figures

CHAIN HAVING PIVOT PINS ALSO PREVENTING DISASSEMBLY

BACKGROUND OF THE INVENTION

A pin bushing which is uniquely pivotable respecting the center link of a chain of the trolley conveyor type is disclosed and claimed in U.S. Pat. No. 4,150,584. Chain of this type comprises links having elongated pin openings through which the T-heads of the pins may be passed for chain assembly and disassembly. My copending application Ser. No. 938,616 filed Aug. 31, 1978 now U.S. Pat. No. 4,198,814 for Chain Having Disassembly Detent and this application are directed to preventing the inadvertent disassembly of such chain.

SUMMARY OF THE INVENTION

The center link of a trolley conveyor type chain is molded at each end with two studs which project into the slot provided for the pin and project toward each other. The two opposing studs define the pivot axis on which the insert is pivotable as for chain sideflexing. The distance between the ends of the opposing studs is less than the diameter of the pin such that the studs form detents which restrain the pin and prevent unintended disassembly of the chain.

DESCRIPTION OF THE PREFERRED EMBODIMENT

Figure 1:
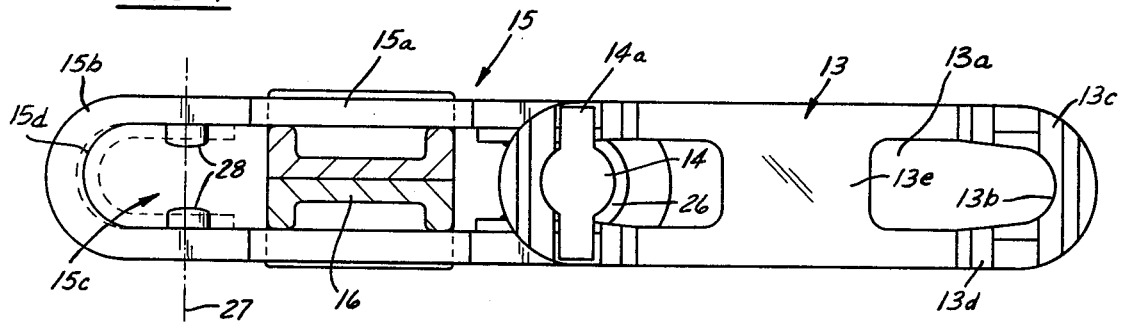
FIG. 1 is a plan view of two links of a chain embodying the present invention. The bracket which supports the center link is sectioned. One of the bushings of the center link is shown by broken lines.
Figure 2:
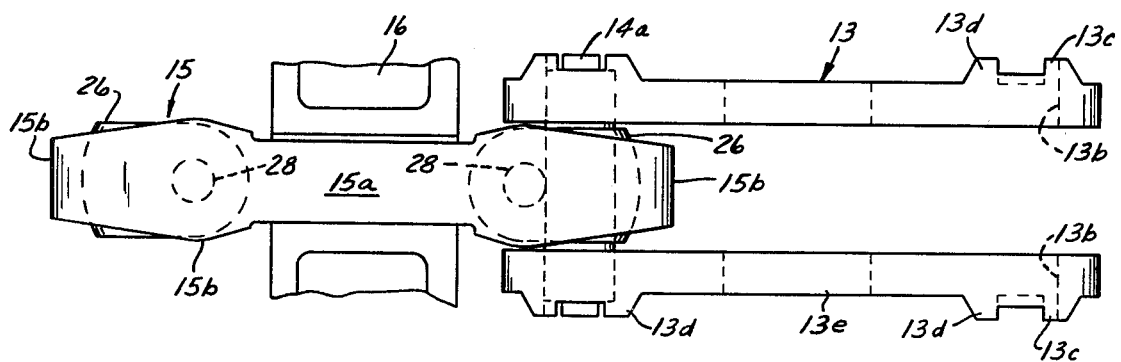
FIG. 2 is a side view of the two links shown in FIG. 1 and of a portion of the support bracket. One of the bushings of the center link is shown by broken lines.
Figure 4:
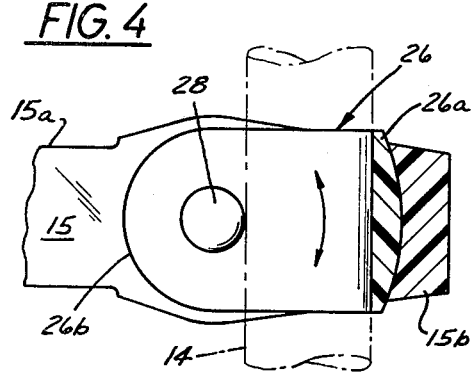
FIG. 4 is a section taken on line 4—4 of FIG. 3. The pin is shown in broken lines, only in its normal position.

The two pin links 13 are joined by two T-headed pins including the pin 14 which as shown connects links 13 and the center link 15. The chain is supported at regular intervals by suitable trolley brackets, including the bracket 16 shown in part and which extends through the link, that is, between the spaced bars 15a of the link. The articles, not shown, are supported directly by the brackets.

Each pin 14 is cylindrical and has a T-head 14a at each end. Each T-head 14a is formed by opposite projections and the projections at the two ends of the pin are similarly oriented and should be of a width not greater than the diameter of the pin.

Each pin link 13 has a center slot 13a between the semi-cylindrical bearing areas 13b at the opposite ends of the link. Two pin links 13 with two pins bearing against the respective bearing areas 13b form a pin link assembly. In such assembly the T-heads 14a overlie the opposite sides of the links 13 and are retained between the several projections 13c and 13d of the links. Projections 13c are at the ends of the respective links 13 and projections 13d are nearer the centers of links 13. In some chains each link 13 may include a center web 13e, such that the link has two slots.

Each center link 15 is in the form of an elongated loop having U-shaped ends 15b integrally joined by the spaced parallel bars 15a. The two ends 15b and the two bars 15a define a central lengthwise slot 15c extending between the two semi-cylindrical bearing areas 15d. The center link 15 is provided at each end with the U-shaped bushing 26 which includes the semi-circular portion 26a and the spaced parallel arms 26b. The inner surface of portion 26a is cylindrical and forms a journal bearing for the relative rotation of pin 14 about its axis. The outer surface of portion 26a fits the corresponding inner surface of the end 15b of link 15. The two corresponding surfaces are circular with respect to the axis 27 which is normal to that of pin 14 and is offset therefrom as shown by the broken line 27 in FIG. 1. The U-shaped ends 15b of center link 15 are widened to space the pin links 13 and each bushing 26 is of a width to fit between the spaced pin links.

In the assembled chain each bushing 26 of a center link 15 extends between the corresponding ends of the two adjacent pin links 13. When the chain is in tension the pin 14 at each chain joint bears against the bearing area 15d of link 15 and against the bearing area of the bushing. For chain articulation as in operation over a sprocket not shown, the bushing turns on a pin 14, i.e. about the axis of the pin. Some side-flexing of the chain in the plane of the pin axis is also allowed by the spacing of links 13 and the pivoting of the bushings about their respective axes. For that purpose, the bars 15a of center link 15 are molded with the aligned studs 28 located on axis 27 to fit in the corresponding holes of arms 26b of the bushing. Studs 28 provide some support of the chain, and pilot the bushing the pivoting as described.

Figure 3:
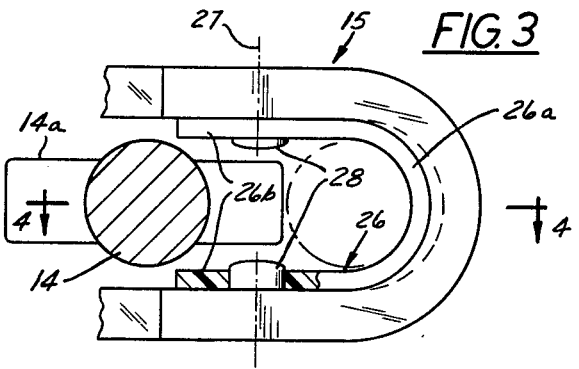
FIG. 3 is an enlarged plan view of one end of the center link and shows the normal position of the pin in broken lines. The pin shown in section is positioned and turned for removal.

In the assembly of the chain at each chain joint, the two corresponding ends of two pin links 13 are spaced by the bars 15a of a center link 15 and a pin 14 is inserted in slots 13a of links 13 and in slot 15c of the link 15. The position of pin 14 respecting the center link is shown in FIG. 3. The pin is then turned 90° and the narrower spacing of links 13 allows the T-heads 14a to clear projections 13d of links 13 so that pin 14 may be moved laterally in the slots and against the bearing area of bushing 26. That is, center link 15 is then pulled lengthwise so that the pin 14 is moved laterally between bars 15a and against the bearing area of the bushing to the position shown in broken lines in FIG. 3. The disassembly of the chain is the reverse. That is, a center link 15 is moved lengthwise so that its narrower bars 15a allow the ends of links 13 to be moved together sufficiently to allow the T-heads 14a of pin 14 to clear projections 13d. Pin 14 can then be turned 90° and moved laterally in slots 13a of links 13 and slot 15c of link 15 which are in registry and the pin is then withdrawn endwise from the slots.

The ease of such assembly and disassembly is a distinguishing feature of such chain. However, the chain is usually handled in lengths of some number of feet and in handling, the chain may come apart in shorter lengths. According to the present invention, the distance between the ends of studs 28 of each center link 15 at each end is less than the diameter of pin 14 so as to interfere moderately with moving the pin laterally in assemblying and disassemblying the chain as described. That is, the distance is just slightly less than the diameter of pin 14 so that some force is required to move the pin therebetween.

If the link 15 is of iron or steel construction the high modulus of elasticity of the link allows only a very slight interference and is impracticable to provide. However, the links 13 and 15 are molded of an engineering thermoplastic such as an acetal resin and two factors are changed. One is that the chain is then of much less weight per given length and convenient handling of the chain in much longer lengths is possible. The longer lengths are more susceptible of coming apart and practicably preventing such occurrences is especially desirable. The other factor, of course, is the lower modulus of elasticity of the chain, which is such that studs 28 may be practicably included in the link as molded.

I claim:

1. In a chain wherein each chain joint includes the corresponding spaced ends of two pin links, one end of a center link which is intermediate said pin link ends, and a T-headed connecting pin extending through said ends; said chain being of the type wherein the center link end includes spaced bars defining therebetween an elongated opening for the pin and wherein the pin is removable by a sequence of steps which includes first moving the pin laterally in said opening; the improvement wherein the center link is of a molded thermoplastic construction and is provided with a U-shaped bushing between the spaced bars and in which the pin is turnable, the two bars of the center link being molded with aligned studs which project toward each other and on which the bushing is pivotable, the distance between the ends of the opposing studs being less than the diameter of the pin (a) to such extent with regard to the stiffness of the bars that manually moving the pin deliberately between the studs is possible as in the intentional disassembly of the chain and (b) to such extent with regard to the stiffness of the bars that manually moving the pin unintentionally between the studs as in handling the chain is improbable.

2. In a chain having pairs of spaced pin links, center links and a T-headed pin at each chain joint and connecting the corresponding ends of each pair of pin links and the end of the adjacent center link, said ends having pin assembly slots in partial registry so as to define the bore for the pin, the center link being turnable on the pin for chain articulation and laterally pivotable on the pin for chain side-flexing, the outside of each pin link being indented to receive and retain the T-head, each center link being narrowed between its ends to allow a chain assembly and disassembly procedure which includes and requires laterally shifting of the pin in the center link assembly slot, said chain being of the type wherein the center link includes a U-shaped bushing which defines the pin bore and the assembly slot in part and which is turnable with the pin in side-flexing of the chain; the further improvement wherein the center link is of a molded thermoplastic construction and is provided with aligned studs which project toward each other and on which the bushing is pivotable, the distance between the ends of the studs being less than the diameter of the pin such that shifting of the pin for removal requries deforming the center link with a deliberate effort to move the pin past and between the studs, and the inadvertent or unintentional release of the pin is prevented.

* * * * *